US009070224B1

(12) United States Patent
Esfahbod MirHosseinZadeh Sarabi et al.

(10) Patent No.: US 9,070,224 B1
(45) Date of Patent: Jun. 30, 2015

(54) ACCURATE UPPER BOUND FOR BEZIER ARC APPROXIMATION ERROR

(71) Applicant: Google Inc., Mountain View, CA (US)

(72) Inventors: Seyed Behdad Esfahbod MirHosseinZadeh Sarabi, Toronto (CA); Maysum Panju, Richmond Hill (CA)

(73) Assignee: Google Inc., Mountain View, CA (US)

( * ) Notice: Subject to any disclaimer, the term of this patent is extended or adjusted under 35 U.S.C. 154(b) by 162 days.

(21) Appl. No.: 13/843,035

(22) Filed: Mar. 15, 2013

Related U.S. Application Data

(60) Provisional application No. 61/712,715, filed on Oct. 11, 2012.

(51) Int. Cl.
*G06T 11/20* (2006.01)
(52) U.S. Cl.
CPC ............... *G06T 11/203* (2013.01); *G06T 11/20* (2013.01)
(58) Field of Classification Search
CPC .................................................... G06T 11/203
See application file for complete search history.

(56) References Cited

U.S. PATENT DOCUMENTS

| 5,367,617 A | * | 11/1994 | Goossen et al. | 345/442 |
| 6,115,051 A | * | 9/2000 | Simons et al. | 345/442 |
| 2012/0075310 A1 | * | 3/2012 | Michail et al. | 345/442 |

OTHER PUBLICATIONS

Riskus, "Approximation of a Cubic Bezier Curve by Circular Arcs and Vice Versa." Information Technology and Control, 2006, vol. 35, No. 4, pp. 371-378).*

* cited by examiner

*Primary Examiner* — Xiao Wu
*Assistant Examiner* — Chong Wu
(74) *Attorney, Agent, or Firm* — McDermott Will & Emery LLP

(57) ABSTRACT

In one aspect, the subject disclosure can be embodied in a method for rendering glyphs using circular arcs. A first Bezier curve defining a portion of a glyph outline is approximated using a second Bezier curve that represents a Bezier approximation of a circular arc. An upper bound for the approximation error is estimated based on a maximum distance between the two Bezier curves within a two-dimensional coordinate space. The first Bezier curve is converted to the circular arc approximated using the second Bezier curve for the portion of the glyph outline within the two-dimensional coordinate space, based on the estimated upper bound of the approximation error. The portion of the glyph outline is then displayed within an area of the display.

20 Claims, 5 Drawing Sheets

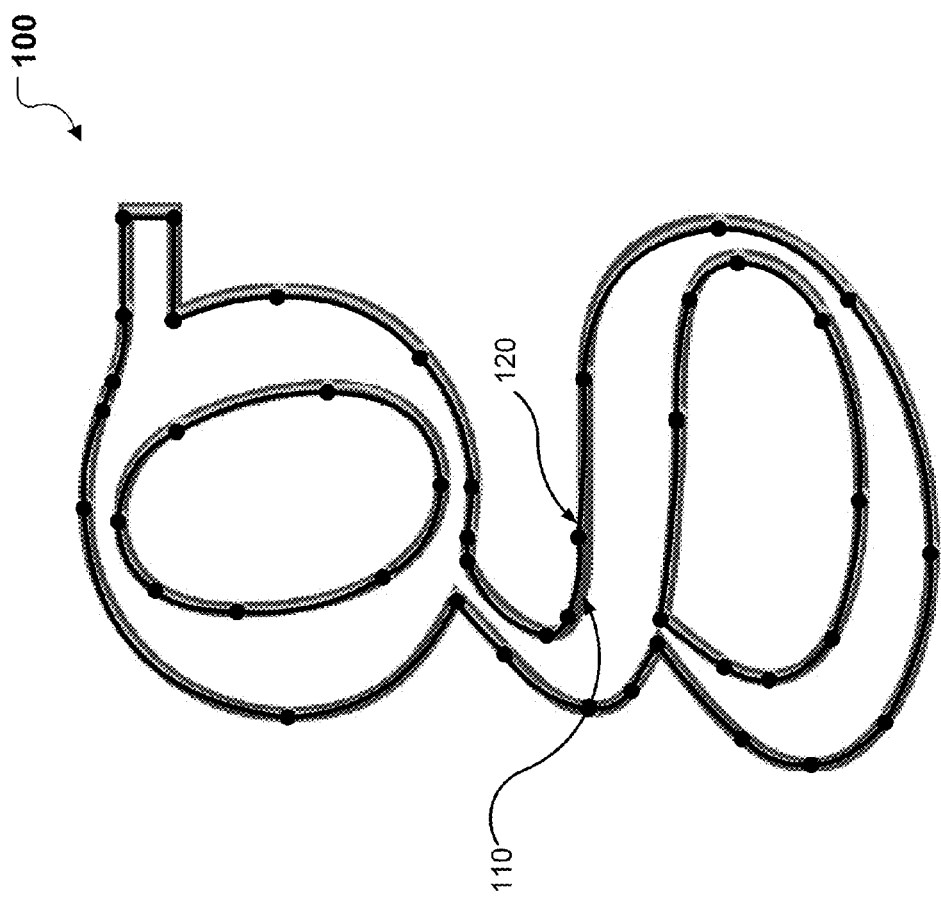

ACCURATE UPPER BOUND FOR BEZIER ARC APPROXIMATION ERROR

CROSS-REFERENCE TO RELATED APPLICATIONS

The present application claims priority benefit under 35 U.S.C. §119(e) from U.S. Provisional Application No. 61/712,715, titled "ACCURATE UPPER BOUND FOR BEZIER ARC APPROXIMATION ERROR" and filed on Oct. 11, 2012, which is incorporated herein by reference in its entirety.

BACKGROUND

The present disclosure relates generally to digital imaging and computer graphics, and particularly, to rendering vector image data on a display.

Bezier curves are parametric curves that are generally used in computer graphics applications to model smooth curves with a more simplified geometric definition. A Bezier curve may be defined using an equation or function based on the type of the curve and, thus, the number of control points defining a shape of the curve. However, the use of some Bezier curves may not be ideal for some graphics operations. For example, it may be difficult to calculate a relatively accurate distance from a given point in space to a Bezier curve, particularly with respect to a cubic or higher-order Bezier curve, an operation performed in various types of applications, e.g., applications for rendering vector graphics or tracking the movement of a pointer device between different points of a user interface. This is primarily due to the relative complexity of equations defining such Bezier curves. It may be possible to simplify operations involving a Bezier curve further by approximating the Bezier curve with one or more circular arcs, as the equations defining circular arcs are relatively less complex and thus, may require fewer calculations. However, as Bezier curves have varied curvatures that generally do not resemble circular arcs, the approximation of a Bezier curve or curve segment with a circular arc generally produces some degree of error that may need to be estimated, e.g., for purposes of generating more accurate approximations.

SUMMARY

The disclosed subject matter relates to rendering a glyph using circular arcs that approximate Bezier curve segments defining the outline of the glyph based on an upper bound approximation error. In one aspect, the subject disclosure can be embodied in a method for rendering glyphs using circular arcs. A first Bezier curve defining a portion of a glyph outline is approximated using a second Bezier curve that represents a Bezier approximation of a circular arc. An upper bound for the approximation error is estimated based on a maximum distance between the two Bezier curves within a two-dimensional coordinate space. The first Bezier curve is converted to the circular arc approximated using the second Bezier curve for the portion of the glyph outline within the two-dimensional coordinate space, based on the estimated upper bound of the approximation error. The portion of the glyph outline is then displayed within an area of the display.

Other aspects can be embodied in corresponding systems and apparatus, including computer program products.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

FIG. 1 shows an example glyph and an outline of the glyph comprising Bezier curve segments approximated using circular arcs.

DETAILED DESCRIPTION

Figure 2A:
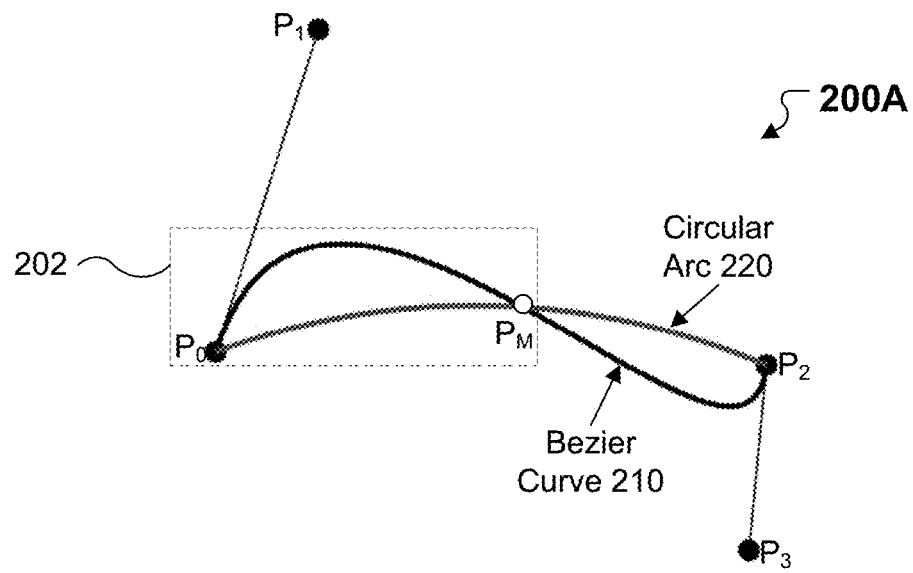
FIG. 2A shows an example cubic Bezier curve having four control points and a circular arc for approximating at least a portion of the Bezier curve.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details.

The disclosed subject matter relates to approximating and rendering a vector graphics image based on an upper bound determined for the approximation error that is a relatively more accurate representation of the actual error in comparison with conventional techniques. In an example, each parametric curve (e.g., cubic or other high-order Bezier curve) in a set of connected curves or curve segments defining a curved outline of the vector graphics image is approximated using a set of circular arcs. Although the use of circular arcs reduces computational complexity, there is generally some amount of error between the approximation and the original vector graphics image that it represents. Therefore, approximation techniques must balance accuracy of the approximation with computational efficiency. In some implementations, an upper bound for the approximation error may define, for example, a maximum error tolerance or acceptable level of error for the approximation, above which any approximation error is considered unacceptable. As will be described in further detail below, a relatively accurate upper bound error may be determined for an approximation of at least a portion of a vector graphics image such that the maximum error tolerance for the approximation is decreased and the accuracy of the approximation is increased. In contrast with conventional solutions, the subject technology allows the vector graphics image to be approximated in a relatively efficient manner with a greater level of accuracy and without increasing the level of operational complexity.

The vector graphics image to be rendered on the display may be, for example, a text character or symbol. In an example, the text character or symbol is in the form of a glyph, e.g., a graphical representation of the character or symbol in accordance with a particular typeface or font definition. Thus, the techniques described herein may be used in text rendering applications for improving the quality of the rendered text including text rendered in combination with other graphics data (e.g., geographic information for a digital mapping application). However, it should be noted that the techniques described herein are not intended to be limited to rendering text and may be used for rendering other types of vector graphics images including, but are not limited to, graphical icons or graphics models incorporating curved shapes or patterns.

FIG. 1 illustrates an example glyph 100 for the letter 'g' of the English alphabet. In some implementations, an outline 110 of the original glyph is approximated using a set of circular arcs to form an approximated glyph outline 120. In this example, outline 110 corresponding to the shape of the original glyph is defined by a set of Bezier curves or curve segments. Each Bezier curve segment may be approximated, for example, using one or more of the circular arcs in the set forming outline 120. As shown in FIG. 1, the varied curvature of outline 110 (including at least one Bezier curve) is divided into multiple curve segments. In some implementations, each curve segment produced by the division has a relatively constant curvature. Each segment may then be approximated using a circular arc. In some implementations, the circular arc used to approximate a curve segment shares the same endpoints as the segment. As discussed above, the accuracy of this approximation may be further improved by using an upper bound for the estimated approximation error. As will be described in further detail below, such an upper bound approximation error may be determined such that it is a relatively accurate representation of the actual error of the approximation.

FIG. 2A shows an example approximation 200A of a Bezier curve 210 using a circular arc 220. Bezier curve 210 in this example is a cubic Bezier curve whose shape is defined by four control points ($P_0$, $P_1$, $P_2$ and $P_3$). The four control points may correspond to, for example, different parameters of a parametric function defining the curvature or shape of Bezier curve 210. Such a function may be represented using, for example, the following polynomial equation:

$$(1-t)^3 P_0 + 3t(1-t)^2 P_1 + 3t^2(1-t)P_2 + t^3 P_3$$

where a parameter t may have values ranging between 0 and 1 and the sum of all polynomial coefficients corresponding to the respective four control points is equivalent to 1. Using the example function above, the shape or curvature of Bezier curve 210 may be adjusted by changing one or more parameter values for different control points defining the shape of Bezier curve 210. In some implementations, a similar parametric function may be used as an error function for estimating the error associated with an approximation of Bezier curve 210 or a segment of Bezier curve 210, as will be described in further detail below.

Figure 2B:
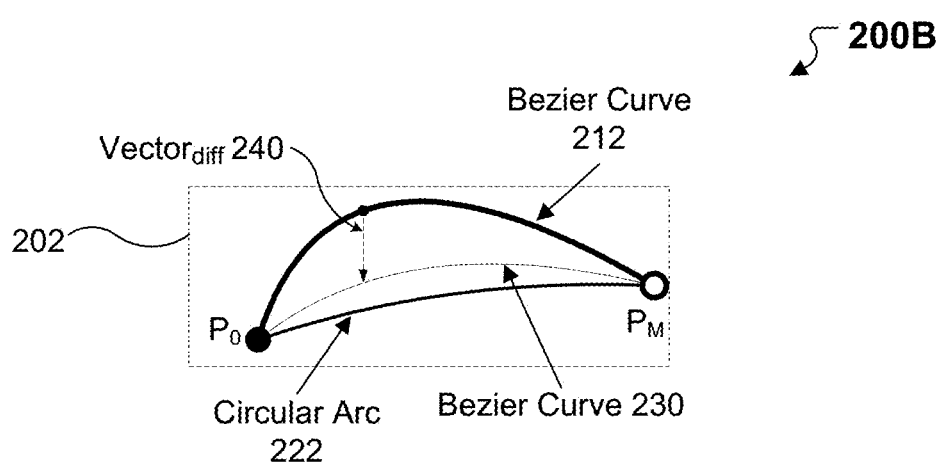
FIG. 2B shows a segment of the Bezier curve and corresponding portion of the circular arc of FIG. 2A, in which a second Bezier curve is used to approximate the first Bezier curve.

As shown in FIG. 2A, control points P0 and P2 represent the endpoints of Bezier curve 210. Also, as shown in FIG. 2A, the endpoints P0 and P2 are shared between circular arc 220 and Bezier curve 210. To improve the accuracy of approximation 200A in this example, Bezier curve 210 may be divided into multiple curve segments. As shown in the examples of FIGS. 2A and 2B, Bezier curve 210 is divided at a midpoint $P_M$ located between endpoints P0 and P2, thereby producing two curve segments of equal length. However, it should be noted that the techniques described herein are not limited to Bezier curve segments of equal length and that Bezier curves may be divided at different points to produce curve segments of varying lengths. As will be described in further detail below with respect to FIG. 2B, a segment of the divided Bezier curve 210 can be further approximated based on a technique for determining an upper bound approximation error, below which the estimated approximation error is maintained.

FIG. 2B shows an example approximation 200B of a portion 202 of Bezier curve 210 of FIG. 2A. As shown in FIG. 2B, portion 202 corresponds to a segment 212 of Bezier curve 210 (or Bezier curve 212) following the division of Bezier curve 210 into multiple curve segments. Also, as shown in FIG. 2B, Bezier curve 212 is approximated using a circular arc 222. For example, circular arc 222 may represent a segment of circular arc 220 of FIG. 2A corresponding to Bezier curve 212 after it is divided at its midpoint, as described above. Like circular arc 220 for approximation 200A of FIG. 2A, circular arc 222 shares the same endpoints (e.g., P0 and $P_M$) as Bezier curve 212 for approximation 200B.

In some implementations, rather than approximating Bezier curve 212 using circular arc 222, Bezier curve 212 is approximated using another Bezier curve 230. As shown in FIG. 2B, Bezier curve 230 in this example shares the same endpoints ($P_0$ and $P_M$) as Bezier curve 212. In general, approximating a circular arc with a Bezier curve is relatively less complex and requires fewer operations than approximating a Bezier curve using a circular arc. In this example, Bezier curve 230 represents a Bezier approximation of circular arc 222. In some implementations, such a Bezier approximation of a circular arc may be used to determine an upper bound of the approximation error for approximating a parametric curve (e.g., Bezier curve 212) defining a portion of a vector graphics image (e.g., glyph 100 of FIG. 1, described above) using a relatively simpler curve, e.g., a flatter curve having relatively less and/or constant curvature. Bezier curve 230 may be, for example, a simpler curve, or a lower-order (or lesser-degree) curve relative to Bezier curve 210 (e.g., quadratic Bezier curve vs. cubic Bezier curve). As described above, such an upper bound for the approximation error allows the vector graphic image to be approximated with a greater degree of accuracy relative to conventional solutions. For example, the estimated approximation error may be based on a maximum distance between Bezier curves 212 and 230, as represented by a difference vector 240. Thus, the techniques described herein may be used to improve computing performance in various applications for rendering text or other vector graphics image comprising multiple Bezier curves that define the shape or outline of the image, as will be described in further detail below.

Figure 3:
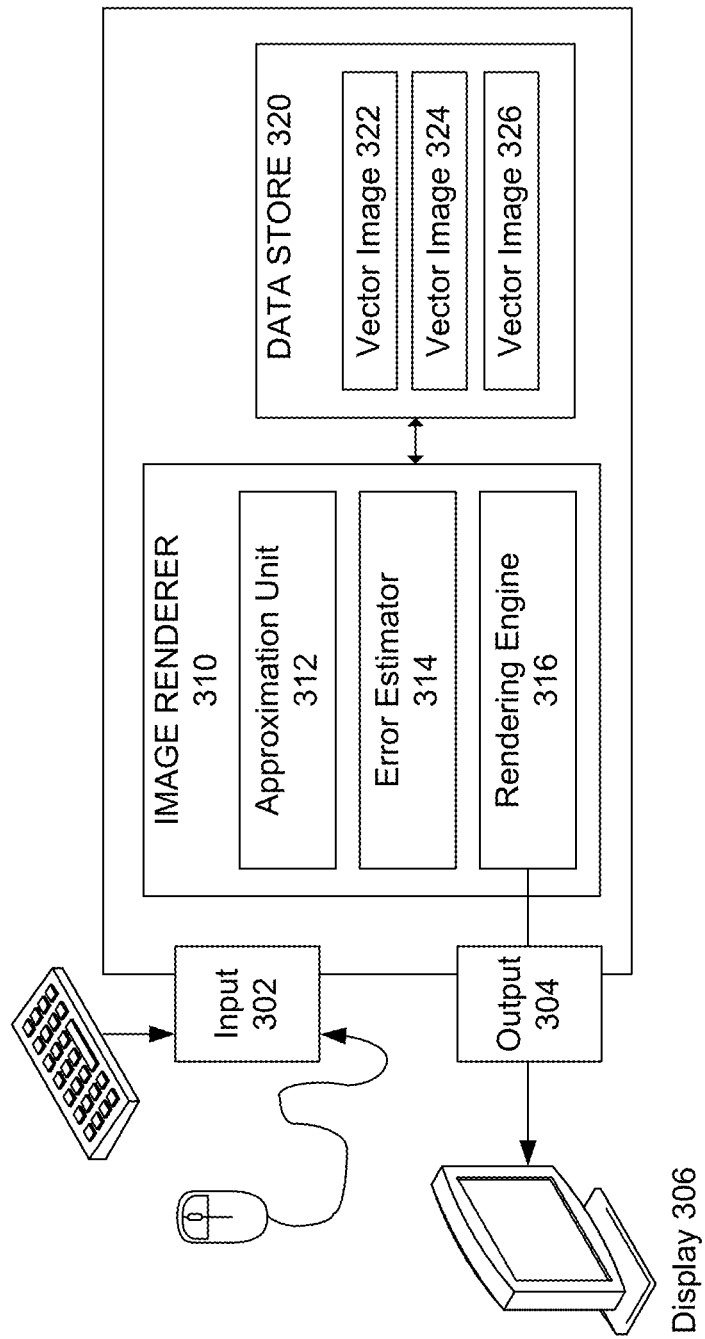
FIG. 3 is a functional block diagram of an example computing system for approximating a vector graphics image based on an upper bound for the approximation error and rendering the approximation to a display.

FIG. 3 is a functional block diagram of an example computing system 300 for approximating a vector graphics image based on an upper bound for the approximation error and rendering the approximation to a display. For purposes of discussion, system 300 will be described using glyph 100 of FIG. 1 and the Bezier curves and circular arcs described for example approximations 200A and 200B of FIGS. 2A and 2B, respectively, as described above. However, system 300 is not intended to be limited thereto. As shown in FIG. 3, system 300 includes an input interface 302 coupled to one or more user input devices (e.g., mouse, keyboard, etc.), an output interface 304 coupled to a display 306, an image renderer 310 and a data store 320. Further, image renderer 310 includes an approximation unit 312, an error estimator 314 and a rendering engine 316.

System 300 can be implemented using any type of general-purpose or specialized computing device with at least one processor and local memory. Examples of such computing devices may include, but are not limited to, a desktop computer, a laptop computer, a handheld computer, a personal digital assistant (PDA), a cellular telephone, a network appliance, a camera, a mobile handset (e.g., a mobile phone or tablet computer), a media player, a navigation device, an email device, a game console, set-top box, television having a processor and memory for executing and storing instructions or any combination of these or other data processing devices. Additionally, input interface 302 of system 300 may be used to receive input from a user via one or more user input devices including, but not limited to, a QWERTY or T9 keyboard, a mouse or other type of pointing device, a microphone or touch-screen display. Further, output interface 304 may be used to output or display content to display 306. Display 306 may be any type of display device including, for example and without limitation, a cathode ray tube (CRT) monitor, liquid crystal display (LCD) screen or light-emitting diode (LED) display. Display 306 also may be implemented as a touch-screen display capable of receiving user input as well as outputting information to the user. As such, the functionality of interfaces 302 and 304 may be combined into a single input/output interface.

Although not shown in FIG. 3, system 300 may include additional components and device interfaces as may be necessary or desired for a particular implementation. For example, system 300 may also include a network interface (not shown) for communicating information with another computing device or system through a network. Such a network can be any network or combination of networks that can carry data communication. The network may include, but is not limited to, a cellular network, a local area network, medium area network, and/or wide area network, e.g., the Internet, or a combination thereof for communicatively coupling any number of mobile clients, fixed clients, and servers.

Data store 320 can be any type of memory device or recording medium for storing persistent data. Further, data store 320 may be a local data storage device or a remote storage device communicatively coupled to system 300, for example, via a network interface (not shown) of system 300. Data store 320 may be used to store any type of data. As shown in FIG. 3, data store 320 may be used to store vector images 322, 324 and 326. As described above, vector images 302, 304 and 306 may be any of various types of vector graphic images including, but not limited to, computer graphics images or glyphs or portions thereof (e.g., Bezier curves or curve segment data defining a curved outline or boundary of a glyph). The different vector images may be stored, for example, as one or more files in association with an application program executable at system 300.

In some implementations, image renderer 310 may be configured to render vector images 322, 324 or 326 (e.g., text or computer graphics models) to display 306 via a user interface of an application program executable at system 300. The application program may be any of various types of application programs that involve the rendering of text or vector graphics images. Such an application program may be, for example, a client application associated with a mapping service in which geographic information in the forms of text glyphs are rendered along with other graphics data on an interactive map displayed using display 306 for a user at system 300. In this example, the techniques described herein may be used to improve the quality of the rendered text including text rendered in combination with other graphics data. Although not shown in FIG. 3, system 300 may include additional components for implementing different functions of system 300. Such functions may include, for example and without limitation, user interface management functions enabling the user at system 300 to interact with the rendered vector graphics images 322, 324 and 326 for various purposes including, but not limited to, editing, modifying or transforming portions of the rendered images (e.g., editing text rendered to a display in a browser or text editing application).

In some implementations, the interface may be provided as a web interface within, for example, a web browser executable at a client device of the user. In providing such a web interface, computing system 300 may function as a server in a client-server architecture for providing the interface and associated visualizations through a network to a web browser or other application executable at a client device of the user. Such a network can be any network or combination of networks that can carry data communication and can include, but is not limited to, a local area network, medium area network, and/or wide area network such as the Internet. The web version of the interface can be executed as, for example, a script, browser plug-in or other program that executes within the browser or browser plug-in. Further, this web interface may be implemented using any one or a combination of various markup or scripting programming language elements including, but not limited to, Hyper Text Markup Language (HTML) and JavaScript. Like system 300, such a client device may be implemented using any type of general-purpose or specialized computing device with at least one processor and local memory and communicatively coupled to at least one user input device and a display. Examples of such computing devices may include, but are not limited to, a desktop computer, a laptop computer, a handheld computer, a personal digital assistant (PDA), a cellular telephone, a network appliance, a camera, a mobile handset (e.g., a mobile phone or tablet computer), a media player, a navigation device, an email device, a game console or a any combination of these or other data processing devices.

Referring back to FIG. 1, to render glyph 100 to display 306, image renderer 310 may utilize approximation unit 312 to approximate a Bezier curve defining a portion of the original glyph outline 110. Additionally, using the example approximations of FIGS. 2A and 2B, Bezier curve 210 of FIG. 2A may represent such a Bezier curve. Approximation unit 312 in this example may be configured to approximate Bezier curve 210 using circular arc 220 of FIG. 2A, as described above. Also, as described above, approximation unit 312 may be configured to improve the accuracy of this approximation by dividing Bezier curve 210 into segments and each segment (e.g., Bezier curve 212 of FIG. 2B) may be individually approximated using a circular arc (e.g., circular arc 222 of FIG. 2B) similar to that used for the first approximation.

The approximation errors associated with the above-described first and second approximations may then be used by error estimator 314 to estimate or determine the error associated with approximating the first Bezier curve (e.g., Bezier curve 212 of FIG. 2B) with a circular arc (e.g., circular arc 222 of FIG. 2B). This may include, for example, calculating an upper bound of the error for the second approximation between the first and second Bezier curves. In some implementations, error estimator 314 may use an error function to determine/estimate the accuracy or error of this approximation, e.g., where the maximum approximation error may be bounded. As described above, the upper bound for the approximation error may be used to define, for example, a maximum error tolerance or acceptable level of error for the approximation, above which any approximation error is considered unacceptable. By determining a relatively accurate upper bound for the approximation error, the maximum error tolerance defined for the approximation is decreased such that the accuracy of the approximation is increased.

In an example, error estimator 314 determines an upper-bound for the error in approximating the first Bezier curve with the second Bezier curve based on the maximum distances between points on each of the respective curves within a two-dimensional coordinate space. The two-dimensional coordinate space may represent, for example, an area of display 306 to which glyph outline 110 (or approximated glyph outline 120) of glyph 100 of FIG. 1, as described above, is to be rendered. The distances computed by error estimator 314 may include, for example and without limitation: (1) the maximum distance between each point on the first curve to the nearest point on the second curve; and (2) the maximum distance between each point on the second curve to the closest point on the first curve. The nearest point on one curve relative to a given point on the other may be determined based on, for example, a predetermined threshold distance defining a relatively high accuracy radius surrounding each point.

To further improve the accuracy of the upper bound approximation error, the coordinate systems of the first and second Bezier curves may be modified by rendering engine 316 so as to make the Bezier curves invariant to any rotation or translation of either curve within a two-dimensional (2D) coordinate space. For example, making the Bezier curves invariant to rotation or translation allows the calculated maximum distances between the first and second Bezier curves to be unaffected by any rotation of the curves in the 2D coordinate space. This further allows the upper bound of the approximation error to be unaffected by such rotation.

In an example, the length of a difference vector (e.g., Vector$_{diff}$ 240 of FIG. 2B, as described above) may represent the maximum approximation error over all the points along the respective curves. In a further example, the Bezier curves may be transformed by rendering engine 316 from a Cartesian (XY) coordinate system into a new UV-coordinate system by rotating the curves such that a vector from the beginning point to the ending point of each curve (e.g., from point P0 to point $P_M$ of Bezier curves 212 and 230 of FIG. 2B, as described above) would always have a positive U coordinate (referred to herein as the "tangential" component) and a zero V coordinate (referred to herein as the "normal" component). This difference vector may be, for example, a convex combination of two vectors corresponding to points in the UV-coordinate space corresponding to the respective curves. Accordingly, the maximum length of this difference vector may be bound according to the length of the longer of the two vectors being combined.

In the above example, the second Bezier curve transformed into the new coordinate system will have reflectional symmetry in the corresponding 2D coordinate space. Thus, if the circular arc being approximated by this second Bezier curve is very shallow such that the second Bezier curve is nearly a straight line, then it may be assumed that the maximum distance values related to the tangential component (e.g., in the U coordinate plane) of the difference vector may not have to be computed by image renderer 310 (e.g., using error estimator 314) in order to derive the approximation error. As described above, the upper bound of the approximation error may be based on the maximum length of the difference vector connecting points on the first Bezier curve to corresponding points on the second Bezier curve.

Using the above assumption for excluding or discounting the tangential component of the difference vector, the approximation error for the curves can be determined by estimating distances between only those points on the Bezier curves for which the values of the parameter t are the same with respect to the polynomial equations defining the respective first and second Bezier curves, as described above. For example, the tangential component of the upper bound error may be discounted according to a discount factor. The discount factor may be derived using, for example, a trigonometric function based on an angle of the circular arc being approximated by the second Bezier curve.

Accordingly, the upper bound of the approximation error, e.g., as determined by error estimator 314, between the first Bezier curve and the Bezier approximation of the circular arc represents a relatively accurate estimate of the upper bound of the approximation error between the first Bezier curve and the circular arc. Thus, the above-described techniques allow the upper bound of the approximation error to be determined more efficiently, without having to calculate the maximum distance between each of the points on the first Bezier curve to the closest point on the second Bezier curve or circular arc and vice versa. Further, such an accurate upper bound for the approximation error reduces the maximum error tolerance and thus, improves the relative accuracy of the approximation.

In some implementations, the accuracy of the estimated upper bound for the approximation error may be further improved by repeating the approximation using additional Bezier curves. Referring back to example approximation 200B of FIG. 2B, Bezier curve 230 may be one of multiple Bezier approximations of different circular arcs that may be used to approximate Bezier curve 210. Thus, Bezier curve 230 may serve as an initial candidate for the approximation of Bezier curve 210. The approximation may be further improved using additional candidate arcs or Bezier approximations of these candidate arcs. Returning to system 300 of FIG. 3, error estimator 314 may then select the circular arc or Bezier approximation of the arc having the lowest relative approximation error from the set of candidates.

Figure 4:
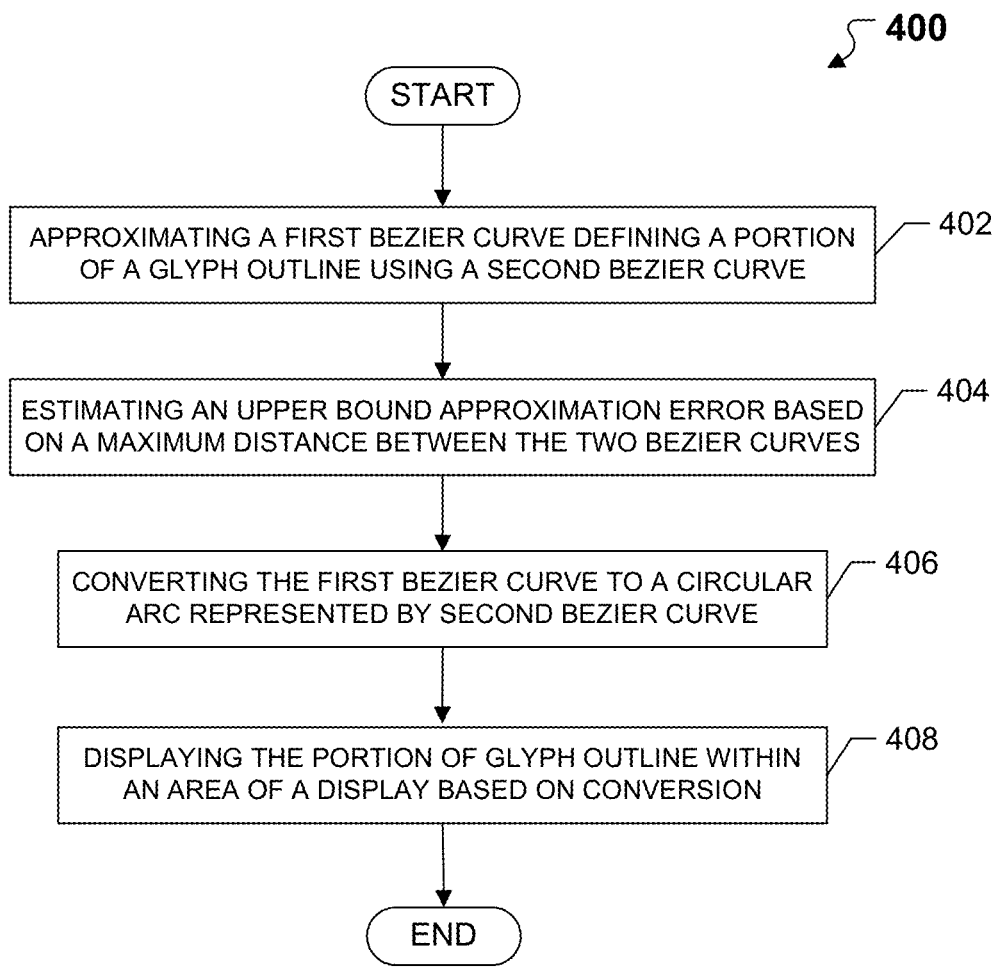
FIG. 4 is a process flow chart of an example method for approximating a vector graphics image based on an upper bound for the approximation error and rendering the approximation to a display.

FIG. 4 is a process flow chart of an example method 400 to approximate a vector graphics image based on an upper bound for the approximation error and rendering the approximation to a display. For purposes of discussion, method 400 may be described using computing system 300 of FIG. 3, as described above. Thus, steps 402, 404, 406 and 408 of method 400 may be performed by, for example, image renderer 310 (including approximation unit 312, error estimator 314 and rendering engine 316) of system 300, as described above. However, method 400 is not intended to be limited thereto. Further, for purposes of discussion, method 400 may be described using the examples illustrated in FIGS. 2A and 2B, as described above. However, method 400 is not intended to be limited thereto.

Method 400 begins in step 402, in which a first Bezier curve defining a portion of a glyph outline is approximated using a second Bezier curve. The portion of the glyph outline (or approximation thereof) will be rendered on a display of a computing device. As described above, the second Bezier curve may represent a Bezier approximation of a circular arc used to approximate the first Bezier curve. For the approximation, this second Bezier curve may have the same endpoints as the first Bezier curve.

In step 404, an upper bound for an approximation error is estimated based on a maximum distance between the first Bezier curve and the second Bezier curve. The maximum distance between the two curves may be based on, for example, distances between points on the first Bezier curve and corresponding points on the second Bezier curve within a two-dimensional coordinate space. As described above, the two-dimensional coordinate space may represent an area of the display (e.g., display 306 of system 300 of FIG. 3, as described above) to which the glyph outline is to be rendered.

Method 400 then proceeds to step 406, in which the first Bezier curve is converted to the circular arc approximated using the second Bezier curve for the portion of the glyph outline within the two-dimensional coordinate space based on the estimated upper bound of the approximation error determined in step 404. In step 408, the portion of the glyph outline is displayed within an area of the display based on the conversion in step 406.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
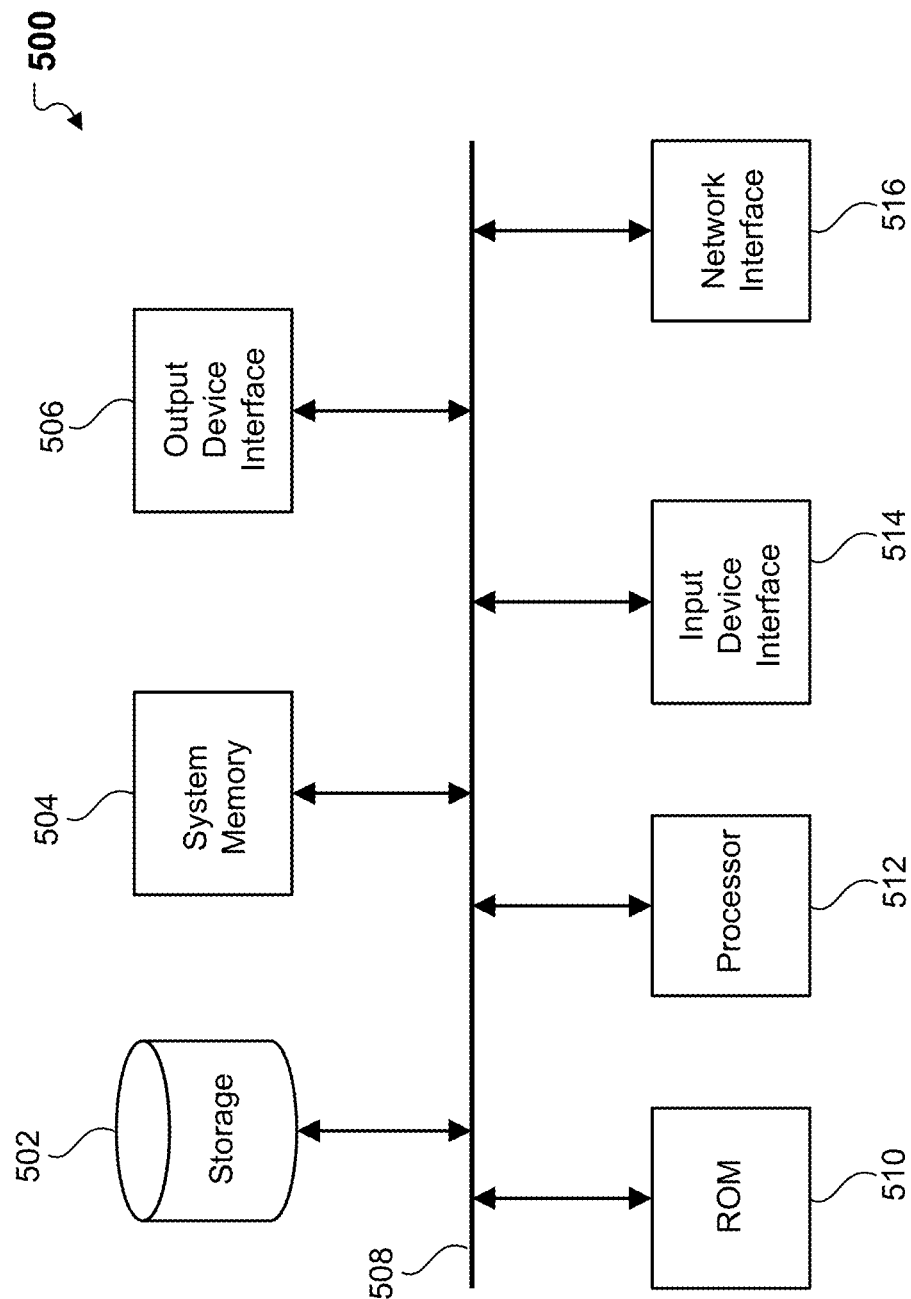
FIG. 5 conceptually illustrates an example electronic system in which portions of the subject technology may be implemented.

FIG. 5 conceptually illustrates an example electronic system 500 with which some implementations of the subject technology are implemented. For example, computing system 300 of FIG. 3, as described above, may be implemented using electronic system 500. Electronic system 500 includes various types of computer readable media and interfaces for various other types of computer readable media. As shown in the example of FIG. 5, electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (e.g., a floppy disk, flash drive or disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data (e.g., vector images 322, 324 and 326 of FIG. 3, as described above) that the processor needs at runtime. In some implementations, the processes of the subject disclosure are stored in system memory 504, permanent storage device 502, and/or ROM 510. For example, the various memory units include instructions for performing the steps of method 400 of FIG. 4, as described above, in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touch-screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for rendering glyphs using circular arcs, the method comprising:
   approximating, by a computing device, a first Bezier curve defining a portion of a glyph outline to be rendered on a display of the computing device, using a second Bezier curve representing a Bezier approximation of a circular arc, the second Bezier curve having the same endpoints as the first Bezier curve;
   estimating an upper bound for an approximation error based on a maximum distance between the first Bezier curve and the second Bezier curve within a two-dimensional coordinate space;
   converting the first Bezier curve to the circular arc approximated using the second Bezier curve for the portion of the glyph outline within the two-dimensional coordinate space, based on the estimated upper bound of the approximation error; and
   displaying the portion of the glyph outline within an area of the display based on the conversion.

2. The method of claim 1, wherein the glyph is a graphical representation of a text character according to a predetermined font definition.

3. The method of claim 1, wherein the first Bezier curve is a cubic Bezier curve having varied curvature and the second Bezier curve is a relatively lower-order Bezier curve having relatively constant curvature.

4. The method of claim 1, wherein the two-dimensional coordinate space represents an area of the display to which the glyph outline is to be rendered.

5. The method of claim 4, wherein the estimating step further comprises:
   determining the maximum distances between points on the first Bezier curve and corresponding points on the second Bezier curve within the two-dimensional coordinate space.

6. The method of claim 4, wherein the approximating step further comprises:
   transforming each of the first and second Bezier curves within the two-dimensional coordinate space such that the first and second Bezier curves are invariant to changes in rotation within the two-dimensional coordinate space, the transformed second Bezier curve having reflectional symmetry within the two-dimensional coordinate space.

7. The method of claim 4, wherein the transforming step comprises:
   transforming each of the first and second Bezier curves from a Cartesian coordinate space in which the second Bezier curve does not have reflectional symmetry to the two-dimensional coordinate space in which the second Bezier curve has reflectional symmetry.

8. The method of claim 4, wherein each of the first and second Bezier curves is defined by an error function including one or more parameters that define a shape of the respective first and second Bezier curves.

9. The method of claim 8, wherein the approximating step further comprises:
   determining the maximum distance between the first and second Bezier curves in the two-dimensional coordinate space based on a length of a difference vector from each point on the first Bezier curve to a corresponding point on the second Bezier curve, the points on the first and second Bezier curves corresponding to matching parameter values of the respective error functions defining each of the first and second Bezier curves.

10. A system for rendering text glyphs using circular arcs, the system comprising:
    at least one processor; and
    a memory device accessible to the processor, the memory device including processor-readable instructions, which when executed by the processor, configure the processor to perform functions to:
    approximate a first Bezier curve defining a portion of a glyph outline to be rendered on a display of the computing device, based on a second Bezier curve representing a Bezier approximation of a circular arc, the second Bezier curve having the same endpoints as the first Bezier curve;
    estimate an upper bound for an approximation error based on a maximum distance between the first Bezier curve and the second Bezier curve within a two-dimensional coordinate space;
    convert the first Bezier curve to the circular arc approximated using the second Bezier curve for the portion of the glyph outline within the two-dimensional coordinate space, based on the estimated upper bound of the approximation error; and
    display the portion of the glyph outline within an area of the display based on the conversion.

11. The system of claim 10, wherein the glyph is a graphical representation of a text character according to a predetermined font definition.

12. The system of claim 10, wherein the first Bezier curve is a cubic Bezier curve having varied curvature and the second Bezier curve is a relatively lower-order Bezier curve having relatively constant curvature.

13. The system of claim 10, wherein the two-dimensional coordinate space represents an area of the display to which the glyph outline is to be rendered.

14. The system of claim 13, wherein the processor is further configured to perform functions to:
    determine the maximum distances between points on the first Bezier curve and corresponding points on the second Bezier curve within the two-dimensional coordinate space.

15. The system of claim 13, wherein the processor is further configured to perform functions to:
    transform each of the first and second Bezier curves within the two-dimensional coordinate space such that the first and second Bezier curves are invariant to changes in rotation within the two-dimensional coordinate space, the transformed second Bezier curve having reflectional symmetry within the two-dimensional coordinate space.

16. The system of claim 13, wherein the processor is further configured to perform functions to:
    transform each of the first and second Bezier curves from a Cartesian coordinate space in which the second Bezier curve does not have reflectional symmetry to the two-dimensional coordinate space in which the second Bezier curve has reflectional symmetry.

17. The system of claim 13, wherein each of the first and second Bezier curves is defined by an error function including one or more parameters that define a shape of the respective first and second Bezier curves.

18. The system of claim 17, wherein the processor is further configured to perform functions to:
   determine the maximum distance between the first and second Bezier curves in the two-dimensional coordinate space based on a length of a difference vector from each point on the first Bezier curve to a corresponding point on the second Bezier curve, the points on the first and second Bezier curves corresponding to matching parameter values of the respective error functions defining each of the first and second Bezier curves.

19. A non-transitory machine-readable medium comprising instructions stored therein, which when executed by a system, cause the system to perform operations comprising:
   approximating, by a computing device, a first Bezier curve using a second Bezier curve representing a Bezier approximation of a circular arc, the first Bezier curve defining a portion of a glyph outline to be rendered on a display of the computing device, the second Bezier curve having the same endpoints as the first Bezier curve, and each of the first and second Bezier curves being defined by an error function including one or more parameters related to a shape of the respective first and second Bezier curves;
   transforming each of the first and second Bezier curves so as to be invariant to changes in rotation with respect to a two-dimensional coordinate space corresponding to an area of a display of the computing device to which the glyph outline is to be rendered, the transformed second Bezier curve having reflectional symmetry within the two-dimensional coordinate space;
   determining a maximum distance between the first Bezier curve and the circular arc being approximated by the second Bezier curve within the two-dimensional coordinate space based on a length of a difference vector from each point on the first Bezier curve to a corresponding point on the second Bezier curve, the points on the first and second Bezier curves corresponding to matching parameter values of the respective error functions defining each of the first and second Bezier curves;
   estimating an upper bound for an approximation error between the first Bezier curve and the circular arc based on the determined maximum distance between the first and second Bezier curves in the two-dimensional coordinate space;
   converting the first Bezier curve to the circular arc approximated with the second Bezier curve for the portion of the glyph outline within the two-dimensional coordinate space, based on the estimated upper bound of the approximation error; and
   causing the portion of the glyph outline to be rendered to the area of the display represented by the two-dimensional coordinate space, based on the converted first Bezier curve.

20. The non-transitory machine-readable medium of claim 19, wherein the glyph is a graphical representation of a text character according to a predetermined font definition.

* * * * *